United States Patent [19]
Angeles

[11] Patent Number: 4,687,294
[45] Date of Patent: Aug. 18, 1987

[54] FIBER OPTIC PLENUM CABLE

[75] Inventor: Purita R. Angeles, Aurora, Ill.

[73] Assignee: Cooper Industries, Inc., Houston, Tex.

[21] Appl. No.: 614,544

[22] Filed: May 25, 1984

[51] Int. Cl.$^4$ .................. G02B 6/44; H01B 7/00
[52] U.S. Cl. .................. 350/96.23; 350/96.10; 174/121 A; 174/121 SR
[58] Field of Search .............. 350/96.10, 96.23, 96.34; 174/110 R, 120 R, 120 AR, 120 SR, 110 FC, 121 A, 121 R, 70 R; 264/1.5, 1.6, 1.7

[56] References Cited

U.S. PATENT DOCUMENTS

| | | | |
|---|---|---|---|
| 4,008,368 | 2/1977 | Leuchs | 174/120 R |
| 4,113,349 | 9/1978 | Stiles | 350/96.23 |
| 4,150,249 | 4/1979 | Pedersen | 174/121 A |
| 4,239,335 | 12/1980 | Stiles | 350/96.23 |
| 4,284,842 | 8/1981 | Arroyo et al. | 174/121 A X |
| 4,319,940 | 3/1982 | Arroyo et al. | 174/121 A |
| 4,331,378 | 5/1982 | Hartig | 350/96.23 |
| 4,340,704 | 7/1982 | Borghi et al. | 526/125 |
| 4,401,845 | 8/1983 | Odhner et al. | 174/121 A |
| 4,500,748 | 2/1985 | Klein | 174/121 R |
| 4,510,348 | 4/1985 | Arroyo et al. | 174/121 A |
| 4,515,435 | 5/1985 | Anderson | 350/96.10 |
| 4,575,184 | 3/1986 | Ueno et al. | 350/96.23 |
| 4,595,793 | 6/1986 | Arroyo et al. | 174/121 A |
| 4,605,818 | 8/1986 | Arroyo et al. | 174/121 A X |
| 4,610,505 | 9/1986 | Becker et al. | 350/96.23 |

OTHER PUBLICATIONS

Underwriters Laboratories Inc. "Standard Test Method for Fire and Smoke Characteristics . . . " 4/82 pp. 1–14.
Article 770, "Optical Fiber Cables" 1984, pp. 980–982.

Primary Examiner—William L. Sikes
Assistant Examiner—Brian M. Healy
Attorney, Agent, or Firm—Fitch, Even, Tabin & Flannery

[57] ABSTRACT

A fiber optical cable is designed for good thermal stability over a broad temperature range and with low flame-spreading and low smoke-producing characteristics for interior use, such as in plenum areas. Optical fibers are each buffered with a layer of resilient polymeric material with a broad dynamic temperature range. A nonburning serving shields the buffer layer from flame, and a jacket of polymeric material surrounds the serving. The jacketed cables are bundled with a like number of strength members formed of a material with a coefficient of thermal expansion roughly matched to that of the optical fibers. The strength members and jacketed fibers are wrapped in tape, and the bundled components are tightly jacketed by a tube of polymeric material. The jackets and outer tube are formed of low flame-spreading, low smoke-producing fluorocarbons, whereby the cable meets U.S. requirements for plenum use. The strength and thermal stability provided by the strength members maintain the light-transmitting characteristics of the optical fibers over the broad temperature range.

11 Claims, 3 Drawing Figures

FIBER OPTIC PLENUM CABLE

The present invention relates to an improved fiber optic cable and more particularly to a fiber optic cable which is intended to extend through plenum regions of buildings for transmission of communication signals.

BACKGROUND OF THE INVENTION

Fiber optic cables have a number of advantages relative to electrical conductor, such as copper wire, for transmission of communication signals. Optical fibers can carry much more data than can a similar size electrical conductor. Very importantly, optical fiber, unlike electrical conductor, is not subject to electromagnetic interference, a feature particularly important when carrying data such as computer signals. Optical cable for data transmission has immediate importance in transmitting communication signals locally, e.g., between one computer or word processing terminal and another. Also, fiber optic cables are considerably lighter than electrical cables.

Localized communication cables extend through buildings, typically through plenum regions between floors of large buildings, and frequently also extend from building to building. It is important that a cable which passes through building plenums or the like have low smoke-producing and low flame-spreading properties. For cables that are to be used in construction in the United States, it is generally required that they meet National Electrical Code requirements pertaining to the smoke-producing and flame-spreading properties of the cable.

At the same time, it is important that the optical cable transmits the optical signal without significant attenuation. Signal attenuation is a particularly significant problem with optical cables that transmit signals through plenum regions with a wide range of temperatures. A communication cable may pass through inside but unheated areas, outside regions where it is subjected to winter temperatures, and at the same time, it may pass through regions in close proximity to heating pipes or the like. Thus, it is considered desirable that an optical cable be stable over a wide range of temperatures, and for a plenum cable, thermal stability preferably includes the temperature range of from −40° C. to 80° C.

Optical fibers consist of a central glass core, through which the light rays are actually transmitted, and means to retain the light within the central core, such as a surrounding cladding having a lower refractive index than the core so that a core-cladding interface tends to reflect rays back into the core rather than penetrate the barrier to become lost from the optical fiber. The transmittance of the optical fiber depends to a large extent upon the uniformity of the core-cladding interface. Light transmitting through an optical fiber travels in different modes, that is, at differing angles with respect to the axis of the core. Lower order light modes pass through the fiber at minimum angles with respect to the core axis, striking the core-cladding interface at low incident angles and reflecting back into the core. Higher order light modes pass through the fiber at greater angles with respect to the axis of the core, and hence strike the interface at greater incident angles and also travel a greater total distance through the fiber. These factors contribute to higher order light modes being relatively quickly lost from the fiber while lower order modes may pass through a substantial fiber length without significant attenuation. The light transmission attenuation of an optical fiber is a function of the uniformity of the core-cladding interface because distortions in this interface generate more easily attenuated higher order light modes from lower order light modes.

Light attenuating distortions in the core-cladding interface may arise if the cable's optical fibers are subjected to differential stress throughout their length. Differential stresses on the fibers may arise when the cable is subjected to wide temperature variations throughout its length as a result of differential thermal expansion and contraction of the various materials of which the cable is formed according to their various coefficients of thermal expansion. The differential stresses may either be radial, as a result of surrounding cable material pressing inwardly differentially on the optical fibers, or longitudinally, as a result of surrounding material expanding or contracting differentially relative to the optical fibers. For a cable which is to be subjected to wide temperature swings throughout its length, it is desirable to isolate the optical fibers from the effects of differential expansion and contraction of the materials as much as possible to minimize attenuation of light transmitted through the fibers.

SUMMARY OF THE INVENTION

A fiber optic cable for carrying communication signals through buildings and also through outside regions includes one or more (typically two) jacketed optical fibers and a like number of rigid strength members encased in an outer tube. The strength members not only add mechanical stiffness to the cable to protect the cable from kinking which might break the optical fibers but thermally stabilize the cable as well. The strength members have a coefficient of thermal expansion sufficiently close to the coefficient of thermal expansion of the optical fibers to control the thermal expansion of the cable in a way that minimizes localized distortion of the optical fibers. The optical fibers are protected against radial stress by a buffer layer of soft elastomeric material.

In order to meet the requirements of low smoke production and low flame spread for a cable that is to be used in building plenums, nonburning or low-burning and low smoke-producing materials are used to an extent that is practical. Also, those components of the cable which are necessarily formed of materials that are more susceptible to spreading flame or producing smoke are surrounded by nonburning material that acts as a flame shield. In particular, the outer tube and optical fiber jackets are formed of low smoke-producing, low flame-spreading fluorocarbon polymers, and the strength member as well as servings which surround each buffer layer, are formed of nonburning materials.

IN THE DRAWINGS

DETAILED DESCRIPTION OF THE PREFERRED EMBODIMENTS

Figure 1:
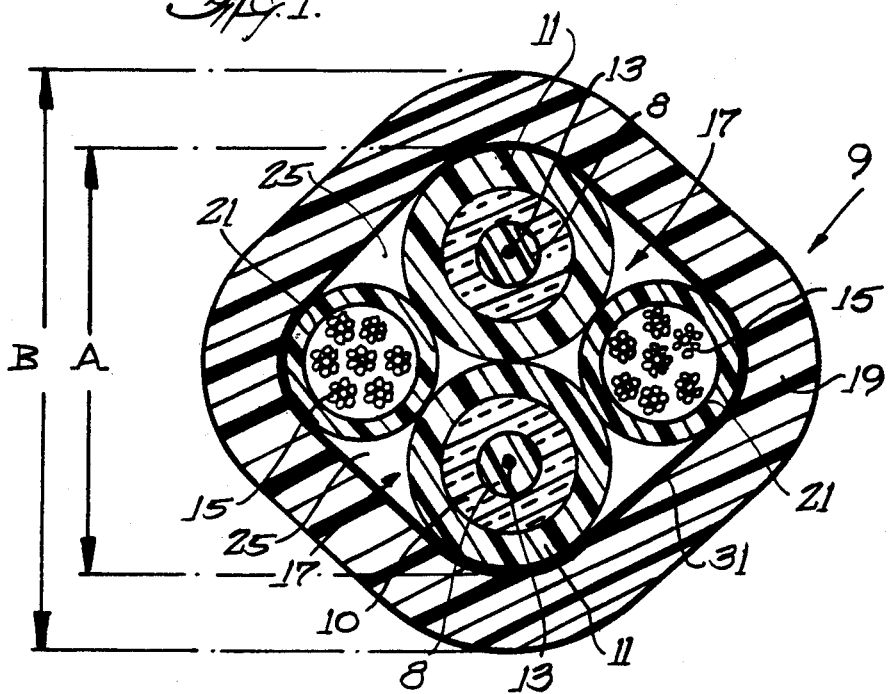
FIG. 1 is a cross-sectional view of the fiber optic cable embodying various features of the present invention.

In accordance with the present invention, an optical cable 9 for transmitting communication signals, e.g., computers or word processors, is provided which thermally stabilizes its optical fibers 13 over a broad temperature range and which has low smoke-producing and low flame-spreading characteristics, whereby the optical cable meets safety requirements for installation in a building where it may pass through a plenum between floors. The cable 9 consists of one or more optical fibers 13, two fibers being generally preferred by equipment installers. Each fiber 13 is surrounded by and in intimate contact with a buffer layer 8 formed of a soft elastomeric material which protects the fiber from radial stress which could create signal-attenuating localized distortions. A serving 10 formed of nonburning material, such as helically wound glass fibers, surrounds the buffer layer 8 to shield the buffer material from flame. The serving 10, in turn, is surrounded by a tightly fitting jacket 11 that is formed of a relatively hard polymer which has low smoke-producing, low flame-spreading properties. As a means of providing both mechanical strength and thermal stability, strength members 15 formed of rigid, nonburning material with coefficients of thermal expansion roughly corresponding to the coefficient of thermal expansion of the optical fibers 13 and entwined with the jacketed optical fibers 17. The components, i.e., the jacketed fibers 17 and strength members 15 are bundled in an outer jacket or tube 19 that is formed of low smoke-producing, low flame-spreading material. The outer tube maintains the relative position of the entwined components.

Figure 2:
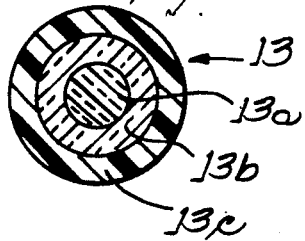
FIG. 2 is an enlarged cross-sectional view of an optical fiber used in the cable of FIG. 1.

The optical fibers 13, as illustrated in FIG. 2, each consists of a glass (fused silica) core 13a through which the light signal is actually transmitted, a glass cladding 13b surrounding the fiber, and a protective polymeric outer layers 13c, which may be formed of a suitable acrylate. The core-cladding interface tends to reflect light back into the core. In a preferred embodiment, the core 13a has a graded index of refraction, increasing from the outside toward the center. The graded index of refraction serves to equalize the speeds the light waves in various modes are transmitted, thereby reducing signal spreading. The cladding 13b preferably has a uniform index of refraction close to that of the outer part of the core 13a. This optical fiber is commercially available and comprises no part of the present invention. The optical fibers 13 are each intended to transmit communication signals, and depending upon the volume of information they are intended to carry and the distance they are intended to carry the information, the fibers have light transmitting cores 13a between about 50 and 100 micrometers in diameter.

An important aspect of the invention is that the buffer layer 8 of elastomeric material in which each optical fiber 13 is sheathed, is soft and compressible over the entire operable temperature range of the cable in order to cushion the fibers against differential radial forces which would otherwise be exerted by other cable members. If the buffering elastomer should harden at low temperatures and lose its elastomeric characteristics, the buffer layers 8 would not cushion the fibers from radial compressive forces and the buffer layers themselves might exert significant radially inward pressure on the optical fibers 13 as they contract, seriously attenuating the light transmittance characteristics of the fibers. For purposes of this invention, the Shore A of the elastomer is between about 64 and about 68 at 23°, 10 sec as measured on as ASTM D2240-Durometer. Fiber optic cable 9 is typically expected to perform when subjected to temperatures as low as −20° C. and sometimes to temperatures as low as −40° C., and the elastomer should not become brittle or lose its resiliency at these low temperatures. The cable is expected to function in relatively hot areas as well, such as in plenum areas closely adjacent heating ducts or hot water pipes. Thus, for purposes of this invention, the dynamic temperature range of the elastomer is typically between about −20° C. and about 80° C. and preferably is between about −40° C. and about 80° C.

The buffer layers 8 are formed around the fibers 13 by extrusion and are in intimate surface contact with the fibers. Suitable polymeric elastomers for extruding as buffer layers 8 around the optical fibers include thermoplastic rubbers, such as those described in U.S. Pat. No. 4,340,704. One elastomer which has been found to be particularly suitable for fiber sheathing is a styrene-ethylene-butylene-styrene block polymer sold under the tradename Shell ELEXAR (Shell trademark) rubber, grade 8431; which has a dynamic temperature range of from −75° C. to 105° C.

In order to meet the smoke and flame-spread requirements of a cable 9 for plenum use, it would be desirable that the buffer layer 8 would have low flame-spreading and low smoke-producing characteristics. However, readily available and reasonably low-cost materials which have the requisite resilient properties for buffering the fibers against pressure are not generally as suitable with respect to smoke-producing and flame-spreading characteristics as would be desired. As a means to reduce the effects of flame on the optical fiber buffer layer 8, the serving 10 formed of nonburning material, such as glass fibers, is wound in a helix around the buffer layer. The serving 10 is preferably at least about 0.28 mm thick (when compressed in the jacket 11) in order to act as a flame barrier, and may be as thick as 0.56 mm or more, as is consistent with size constraints for the cable 9.

The optical fibers 13 are each surrounded by the jacket 11 which is formed of a relatively hard polymeric material. The jacket 11 is formed by a tubing process around the serving 10. As the jacket is formed and cools, it shrinks slightly around the serving pressing it tightly against the buffer layer 8, but not so tightly as to significantly reduce the cushioning effect of the buffer layer. The optical fiber jacket 11 serves to strengthen and protect the optical fiber, particularly closely adjacent the termination sites where the outer tube 19 is cut away to permit separate manipulation of the individual jacketed fibers 17. Adjacent the termination sites, the serving layer 10 cooperates with the fiber jacket 11 in protecting the fiber 13 against kinking. The fiber jackets are typically between about 0.4 mm and about 0.8 mm thick, giving the jacketed fibers 17 a total outside diameter of between about 2.6 mm and about 3.0 mm.

Optical cable 9 must be protected against bending beyond the point where the optical fibers 13 might fracture, and accordingly, the cable includes one or more strength members 15 which add rigidity to the cable. Preferably the number of strength members corresponds to the number of jacketed optical fibers 17; thus, in the illustrated cable, two strength members are entwined with two jacketed optical fibers.

In accordance with an important aspect of the invention, the strength members 15 provide thermal stability to the cable. The polymeric materials that are used to form the jackets, tube and buffer layers generally have coefficients of thermal expansion substantially higher than that of the optical fibers 13, and without a thermal stabilizing member would tend to produce localized distortions in the fibers in regions of temperature differentials. Such distortions would result in significant attenuation of signal.

The strength member 15 may be rigid and have a temperature coefficient within a range close so that of the optical fiber 13. A rigid strength member, such as a strength member formed of steel cable, fiberglass epoxy rod or polymer-coated fiberglass yarn, tends to control the thermal expansion of the cable as a whole. Glass fiber typically has a coefficient of thermal expansion in the range of from about $0.05 \times 10^{-6}$ to about $1.5 \times 10^{-6}$ cm/cm/°C. and a rigid strength member may have a coefficient of thermal expansion from about $0.2 \times 10^{-6}$ to about $15 \times 10^{-6}$ cm/cm/°C. and preferably from about $0.5 \times 10^{-6}$ to about $13 \times 10^{-6}$. These ranges compare favorably to the coefficients of thermal expansion of the polymeric materials used to form the various layers, which typically have coefficients of thermal expansion upwards of about $100 \times 10^{-6}$ cm/cm/°C.

Less rigid strength members 15, such as yarn or rope formed of KEVLAR (duPont trademark) may also be used. Less rigid materials tend to be less controlling of the thermal expansion of the cable as a whole but may nevertheless serve to counteract the high positive coefficients of thermal expansion of the polymeric materials. Thus if the yarn or rope has a thermal coefficient of expansion less than that of the polymer material or close to that of the optical fiber or even a negative coefficient of thermal expansion, it will act to counteract the thermal expansion of the polymer and thereby stabilize the thermal expansion of the cable as a whole to close to the thermal expansion of the optical fibers. If a rope or yarn is used as the strengthening member, the coefficient of thermal expansion of the fibrous material ranges from about $-5 \times 10^{-6}$ to about $15 \times 10^{-6}$ cm/cm/°C. and preferably from about $-2 \times 10^{-6}$ to about $6.5 \times 10^{-6}$ cm/cm/°C.

In preferred embodiments of the present invention, the strength member 15 is surrounded by a thin jacket 21 formed of a relatively rigid polymeric material. Consistent with the need to minimize the flame-spreading and smoke-producing characteristics of the cable, a polymer is selected having these properties. The strength member jacket 21 serves to prevent fraying of the strength member strands or fibers. It also promotes sliding between components, e.g., between the jacketed fibers 17, the strength members 15 and the tape 31 or outer tube 19. Such sliding is necessary wherever the cable must be bent. The strength member jacket 21 is typically formed of a fluorocarbon polymeric material, such as the fluorocarbon material that is used to form the fiber jacket 11 and the outer tube 19. The strength member jacket is typically between about 0.1 mm and about 0.2 mm thick.

In order to permit the cable to bend, the jacketed fibers 17 are entwined in a helical configuration with the strength members 15. Typically, the lay length, i.e., the length of one complete helix is between about 5 and about 30 cm. and preferably between about 10 and about 20 cm. The entwining of the components also promotes thermal coupling between the strength members 15 and the fibers 13.

In preferred embodiments of the invention, the entwined jacketed fibers 17 and strength members 15 and wrapped tightly in a helically wound layer of tape 31. The tape serves to hold the bundle of components together as the outer tube is formed therearound. If the outer tube 19 is formed by extrusion, the tape 31 also helps to hold the outer tube from impinging on the interstices 25 between the components that serve as dead air spaces, insulating the fibers 13. A suitable tape is MYLAR (a DuPont trademark) polyester. Although MYLAR tape does not have the same low flame-spreading and low smoke-producing characteristics as the fluorocarbons used for some of the other polymeric layers, it comprises a relatively low proportion of the total amount of polymeric material, and a cable including a wrap of MYLAR tape can easily meet flame-spreading and smoke-producing requirements. If it is desired to surpass these requirements, a fluorocarbon tape may be substituted for a MYLAR tape.

The outer tube 19 is formed by a tubing process around the entwined and tape bundled components. As it forms and cools, the tube 19 shrinks slightly, firmly binding the strength members 15 and jacketed cables 17 together. The tube 19 generally follows the conformation of the entwined components, giving the cable 9 a twisted appearance. The outer tube 19 is generally relatively thick, typically between about 0.5 mm and about 1.5 mm thick. The outer tube, comprises a sizable proportion of the polymeric material of the cable, and it is important that the material that forms the tube be low smoke-producing and low flame-spreading, e.g., a suitable fluorocarbon.

The same fluorocarbon material can be used for a number of the polymeric layers, or different suitable fluorocarbon polymeric materials can be used. One particularly suitable polymeric material is polyvinylidene fluoride (PVDF), such as that sold under2 the Pennwalt trademark, KYNAR. This material can be used, for example, to form the fiber jackets 11, the strength member jackets 21 and the outer tube 19. The material of which each of these components is formed should have a Shore D hardness at 23° C., 10 sec of between about 65 and 88 and preferably between about 70 and about 78. Other suitable fluorocarbons include but are not limited to polymeric monochlorotrifluoroethylene and polymeric tetrafluoroethylene. In addition to being advantageous with respect to flame resistance, fluorocarbon polymers slide easily against each other, facilitating bending of the cable.

A cable 9 in accordance with the present invention might carry a single jacketed fiber with a single jacketed strength member. Generally, however, two jacketed fibers are required for two-way communication. Additional jacketed fibers 17 and strength members 15 may be jacketed in a single outer tube 19; however, increasing numbers of jacketed cables and strength members increase the stiffness of the cable. A practical upper limit for jacketed fibers in this type of cable is about eight; however, for convenience of installation two are preferred. The jackets 11 around multiple fibers 13 are color coded for installation purposes.

Optical fiber for use in environmental air, such as in a plenum, should meet the standards of section 770-7 of the National Electrical Code (NEC). If a cable does not meet these requirements, it must be encased in a raceway or the like which adds significantly to installation costs. NEC section 770-7 requires that cable for ducts, plenums and other environmental air areas meet or exceed the following parameters in the UL 910 Steiner Tunnel Test (Underwriters Laboratories Inc. "Standard for Test Method for Fire and Smoke Characteristics of Cables Used in Air-Handling Spaces", UL 910 First Edition, as revised Apr. 30, 1982, pages 1-14):

Smoke producing; maximum optical density 0.5, maximum average optical density 0.15.

Fire-resistance; maximum allowable flame travel distance 1.52 meter.

It is preferred that for increased safety the cable exceed the NEC requirements, and herein it is preferred that the maximum optical density be 0.05 or less, the average optical density be 0.02 or less and the flame travel distance be 1 meter or less.

Figure 3:
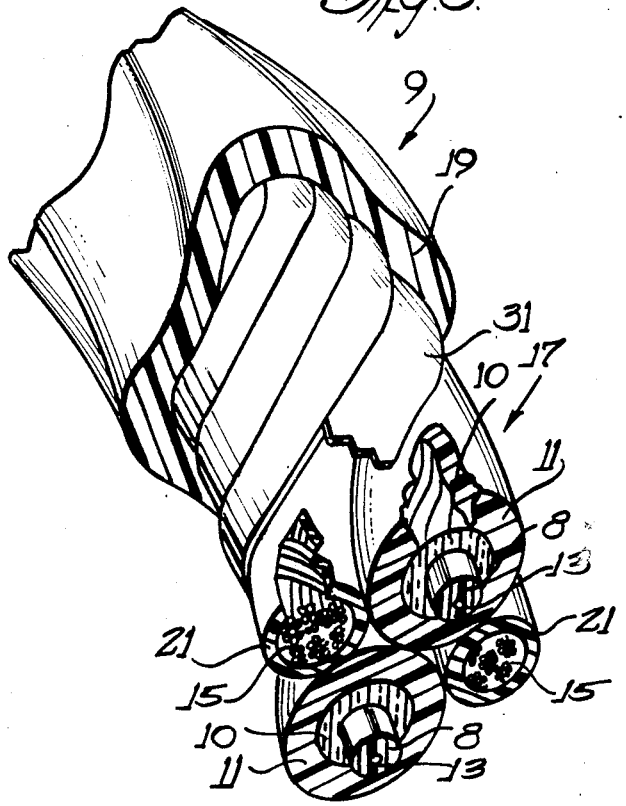
FIG. 3 is a perspective view of the cable of FIG. 1 with various layers stripped away.

Provided by way of specific example is a cable 9 produced by Belden division of Cooper Industries and designated GDO-434. The cable configuration substantially as shown and described in FIGS. 1 and 3, containing two jacketed fibers 17 and two strength members 15. The optical fibers 13, including their outer layer of polymer 13c, have a diameter of 0.5 mm. The buffer layer 8 is 0.2 mm. thick; the serving 10 is 0.28 mm. thick and the fiber jacket 11 is 0.6 mm. thick, giving the jacketed fiber 17 an outside diameter of 2.8 mm. The strength members 15 are steel cables having an effective outside diameter of 1.6 mm., and the strength member jacket 21 has a thickness of 0.15 mm., giving the jacketed strength member an O.D. of 1.9 mm. When bundled as illustrated in FIG. 1 with the jacketed fibers in tangential contact, the extremities of the bundle (distance A) measures about 5.6 mm. in either direction. The bundle is wrapped in Mylar tape of negligible thickness, and the bundle is jacketed in a tube 0.8 mm. thick, giving the cable a measurement through the extremities (distance B) of 7.6 mm. The fiber jacket 11, the strength member jacket 21 and the outer tube 19 are all formed of polyvinylidene fluoride having a Shore D hardness of 76 at 23°, 10 sec. The buffer layer 8 is formed of Shell ELEXAR Rubber, grade 8431 having a Shore A hardness of 66 at 23°, 10 sec.

The flame-spreading and smoke-producing characteristics of this cable described were tested by an independent laboratory according to UL 910 Steiner Tunnel Test specifications. Results are as follows.

| Test No. | No. Of Lengths | Sample Description | Maximum Propagation Distance | Optical Density Peak | Optical Density Average |
|---|---|---|---|---|---|
| 1 | 30* | GD0434 | 0.46 m | 0.02 | Less than 0.01 |
| 2 | 36** | GD0434 | 0.73 m | 0.02 | Less than 0.01 |
| NEC limits | | | 1.52 | 0.50 | 0.15 |

*satisfies area requirements
**exceeds area requirements

These results exceed the requirements of cable for plenum use generally in effect throughout the United States. The cable is found to have excellent thermal performance, increasing about 1½ dB/km over the temperature range of −40° C. to 80° C.

Several advantages of the present invention can now be more fully appreciated. The cable can be easily separated into its components so that each jacketed fiber may be terminated independently. It has outstanding flame resistance and produces minimal amounts of smoke when burned. Its strength members give the cable excellent thermal performance and high mechanical strength.

While the invention has been described in terms of certain preferred embodiments, modifications obvious to one with ordinary skill in the art may be made without departing from the scope of the invention.

Various features of the invention are recited in the following claims.

What is claimed:

1. A fiber optic cable comprising
   a plurality of optical fibers,
   a buffer layer of elastomeric material surrounding and in intimate contact with each of said optical fibers to protect the fiber from radial stresses over a predetermined temperature range,
   a serving of nonburning material around each of said buffer layers,
   a jacket of relatively rigid polymeric material which has low smoke-producing, low flame-spreading properties surrounding said serving,
   a plurality of strength members of rigid, nonburning material for increasing the strength and rigidity of the cable and formed of material having a coefficient of thermal expansion of between about $0.2 \times 10^{-6}$ and about $15 \times 10^{-6}$ cm/cm/°C., said strength members controlling the thermal expansion characteristics of said cable, each strength member being surrounded by a jacket of relatively rigid polymeric material which has low smoke-producing, low flame-spreading properties, and
   an outer tube of low smoke-producing, low flame-spreading material bundling said jacketed optical fibers and said jacketed strength members, compressing the same against each other so that each jacketed optical fiber engages at least two jacketed strength members, whereby said strength members act to thermally stabilize said optical fibers,
   said cable having a flame-spread of 1.52 meters or less, a maximum optical density of 0.5 or less and an average optical density of 0.15 or less as measured in the UL 910 Steiner Tunnel smoke and flame test.

2. A cable according to claim 1 wherein each said fiber jacket is formed of a fluorocarbon having a Shore D hardness at 23° C., 10 sec of between about 65 and about 88 and selected from the group consisting of polyvinylidene fluoride, polymeric monochlorotrifluoroethylene and polymeric tetrafluoroethylene.

3. A cable according to claim 2 wherein each said fiber jacket is formed of a fluorocarbon having a Shore D hardness at 23° C., 10 sec of between about 70 and about 78.

4. A cable according to claim 1 wherein said outer tube is formed of a fluorocarbon having a shore D hardness at 23° C., 10 sec of between about 65 and about 88 and selected from the group consisting of polyvinylidene fluoride, polymeric monochlorotrifluoroethylene and polymeric tetrafluoroethylene.

5. A cable according to claim 4 wherein said outer tube is formed of a fluorocarbon having a shore D hardness at 23° C., 10 sec of between about 70 and about 78.

6. A cable according to claim 1 wherein said strength member is formed of material from the group consisting of steel cable, fiberglass epoxy rod and polymer coated fiberglass yarn.

7. A cable according to claim 1 wherein each said strength member jacket is a material formed of a fluorocarbon having a shore D hardness at 23° C., 10 sec of between about 65 and about 88 and selected from the group consisting of polyvinylidene fluoride, polymeric monochlorotrifluoroethylene and polymeric tetrafluoroethylene.

8. A cable according to claim 7 wherein each said strength member jacket is a material formed of a fluorocarbon having a short D hardness at 23° C., 10 sec of between about 70 and about 78.

9. A cable according to claim 1 wherein said bundled jacketed fibers and jacketed strength members are wrapped in tape and said outer tube surrounds said tape.

10. A cable according to claim 1 wherein said material used to form said buffer layer has a Shore A hardness of between about 64 and about 68 at 23° C., 10 sec and has a dynamic temperature range of from about −20° C. and about 80° C.

11. A cable according to claim 10 wherein said material used to form said buffer layer has a dynamic temperature range of from −40° C. to 80° C.

* * * * *

UNITED STATES PATENT AND TRADEMARK OFFICE
CERTIFICATE OF CORRECTION

PATENT NO. : 4,687,294
DATED : August 18, 1987
INVENTOR(S) : Purita R. Angeles

It is certified that error appears in the above-identified patent and that said Letters Patent is hereby corrected as shown below:

Column 1, line 38, after "through" delete "plenum".
Column 1, line 42, after "through" insert --plenum--.
Column 3, line 29, change "and" to --are--.
Column 3, line 39, change "layers" to --layer--.
Column 3, line 44, after "speeds" change "the" to --that--.
Column 4, line 3, change "as" to --an--.
Column 6, line 4, change "and" to --are--. (second occurrence)
Column 6, line 39, change "under 2" to --under--.
Column 6, line 45, after "and" (first occurrence) insert --about--.
Column 7, line 37, change "7.6" to --7.5--.
Column 9, line 11, change "short" to --shore--.

Signed and Sealed this

Twelfth Day of January, 1988

Attest:

DONALD J. QUIGG

Attesting Officer

Commissioner of Patents and Trademarks